May 9, 1939.  A. RICCIO  2,157,967
TIRE RETREADING DEVICE
Filed April 30, 1936  3 Sheets-Sheet 1

INVENTOR.
ANTHONY RICCIO,
BY John P. Chandler
his ATTORNEY.

May 9, 1939.  A. RICCIO  2,157,967
TIRE RETREADING DEVICE
Filed April 30, 1936  3 Sheets-Sheet 2

INVENTOR.
ANTHONY RICCIO,
BY John P. Chandler
his ATTORNEY.

May 9, 1939.  A. RICCIO  2,157,967
TIRE RETREADING DEVICE
Filed April 30, 1936   3 Sheets—Sheet 3
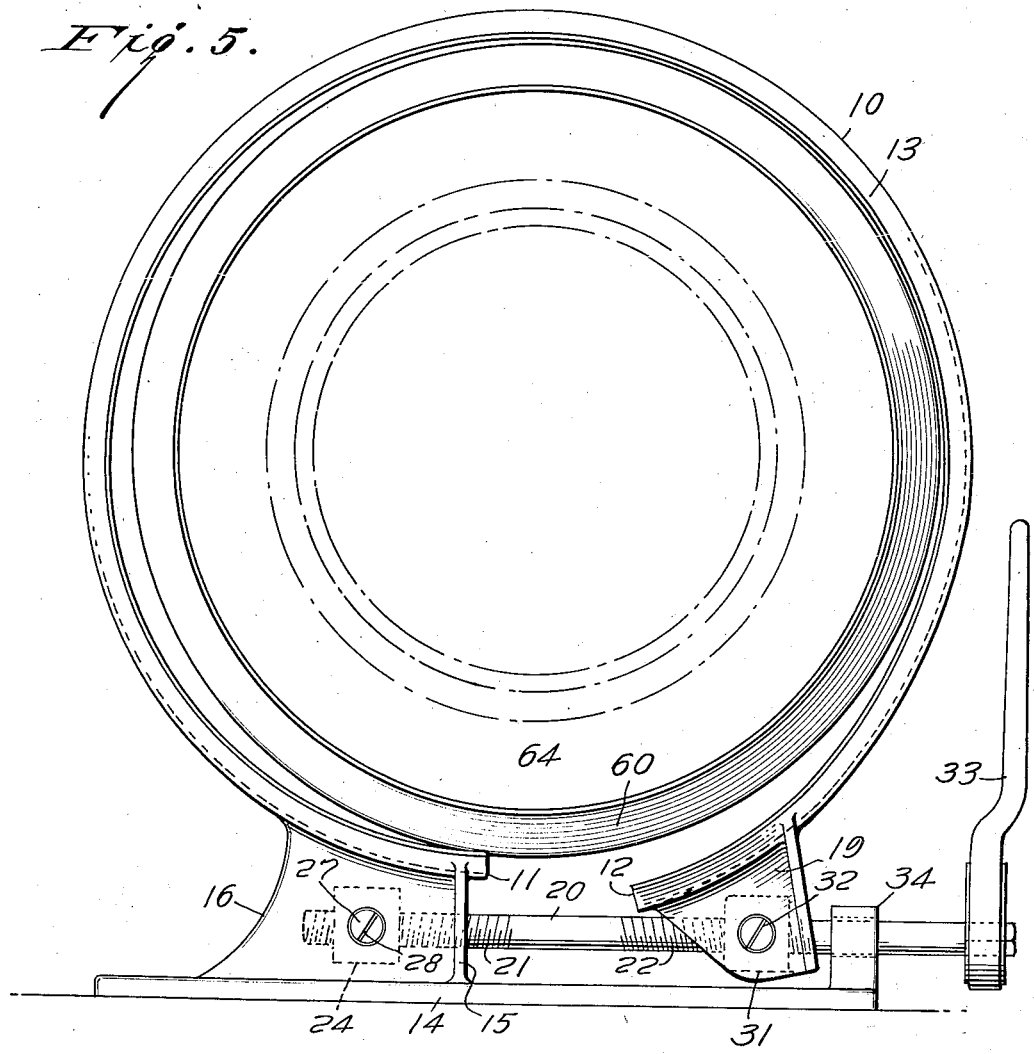
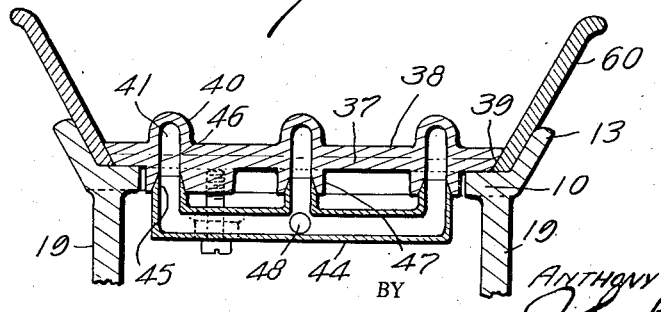
INVENTOR.
ANTHONY RICCIO,
BY John P. Chandler
his ATTORNEY.

Patented May 9, 1939

2,157,967

UNITED STATES PATENT OFFICE 2,157,967

TIRE RETREADING DEVICE

Anthony Riccio, Brooklyn, N. Y., assignor to Vulcan Products Corporation, a corporation of Delaware Application April 30, 1936, Serial No. 77,095

6 Claims. (Cl. 18—18)

This invention relates to improvements in tire retreading devices and has for its principal object the provision of a simple, compact and inexpensive device which will afford adequate support for the tire and will provide a uniform distribution of the heat to all portions of the surface of the retreading material.

Another object of the invention is the provision of an improved tire retreading device having means to easily insert the casing thereinto, this being accomplished without in any manner deforming the tire.

Yet another object of the invention is the provision of a retreading device comprising a split annular tire enclosing member which is provided with a removable internally disposed heating chamber which directly engages the surface of the retreading material, thereby making for a device which is more economical in operation since the amount of heat consumed is materially less than that employed in conventional devices of this character.

A still further object of the invention is to provide a retreading device comprising a relatively flexible split mold having a flexible heating element extending circumferentially of the mold on the inner surface thereof, which heating element may be replaced at will in order to impress varying tread designs upon the retreading material.

In the drawings:

Fig. 5 is a front elevation of the device similar to that shown in Fig. 1, the view, however, showing the tire encircling member in open position; and Fig. 6 is a broken transverse section taken on line 6—6 of Fig. 2.

Figures 1, 2:
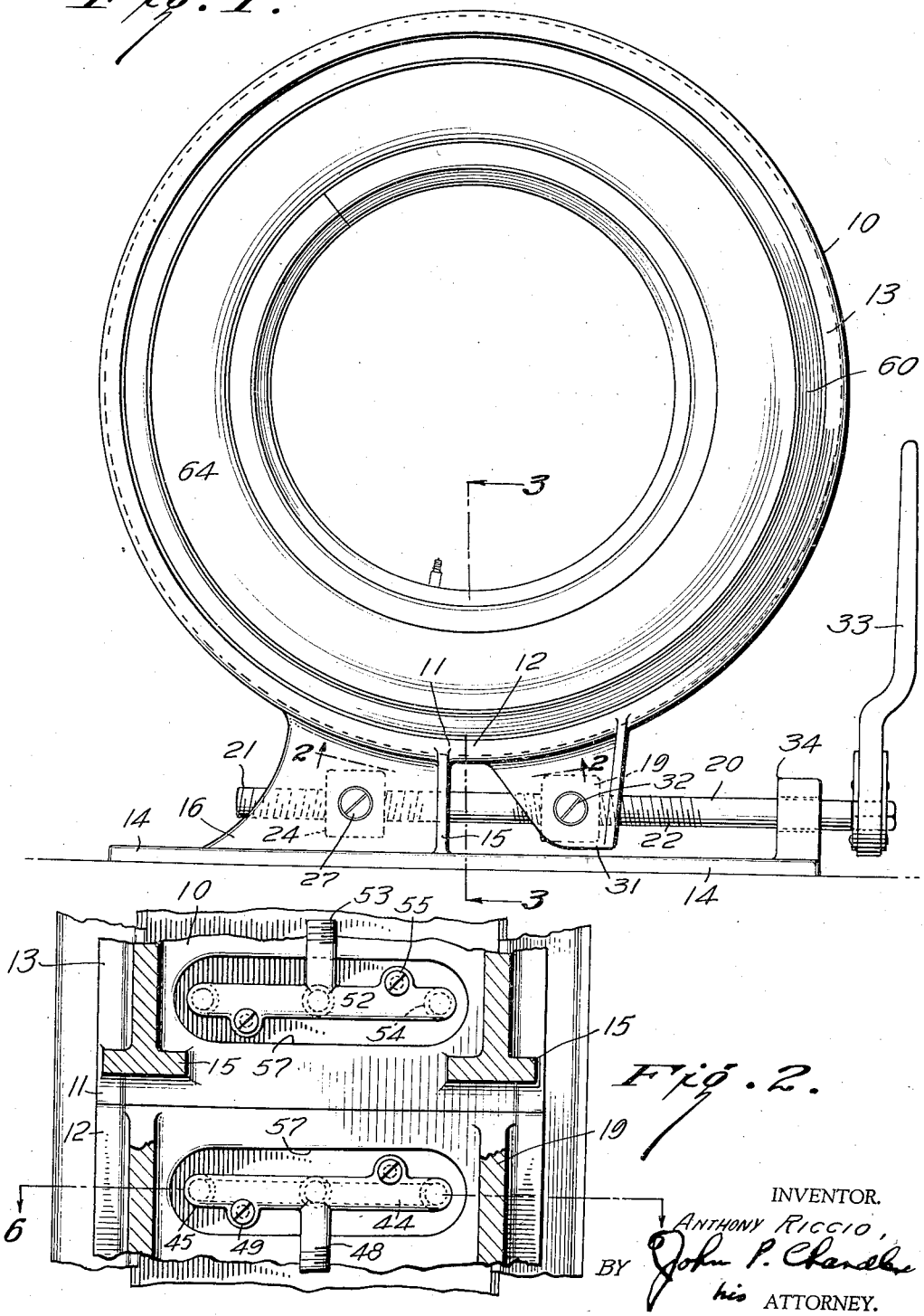
Fig. 1 is a front elevation of the apparatus in its presently preferred form, a tire being shown placed within the device, ready for the retreading operation.
Fig. 2 is a broken section taken on line 2—2 of Fig. 1.
Figures 3, 4:
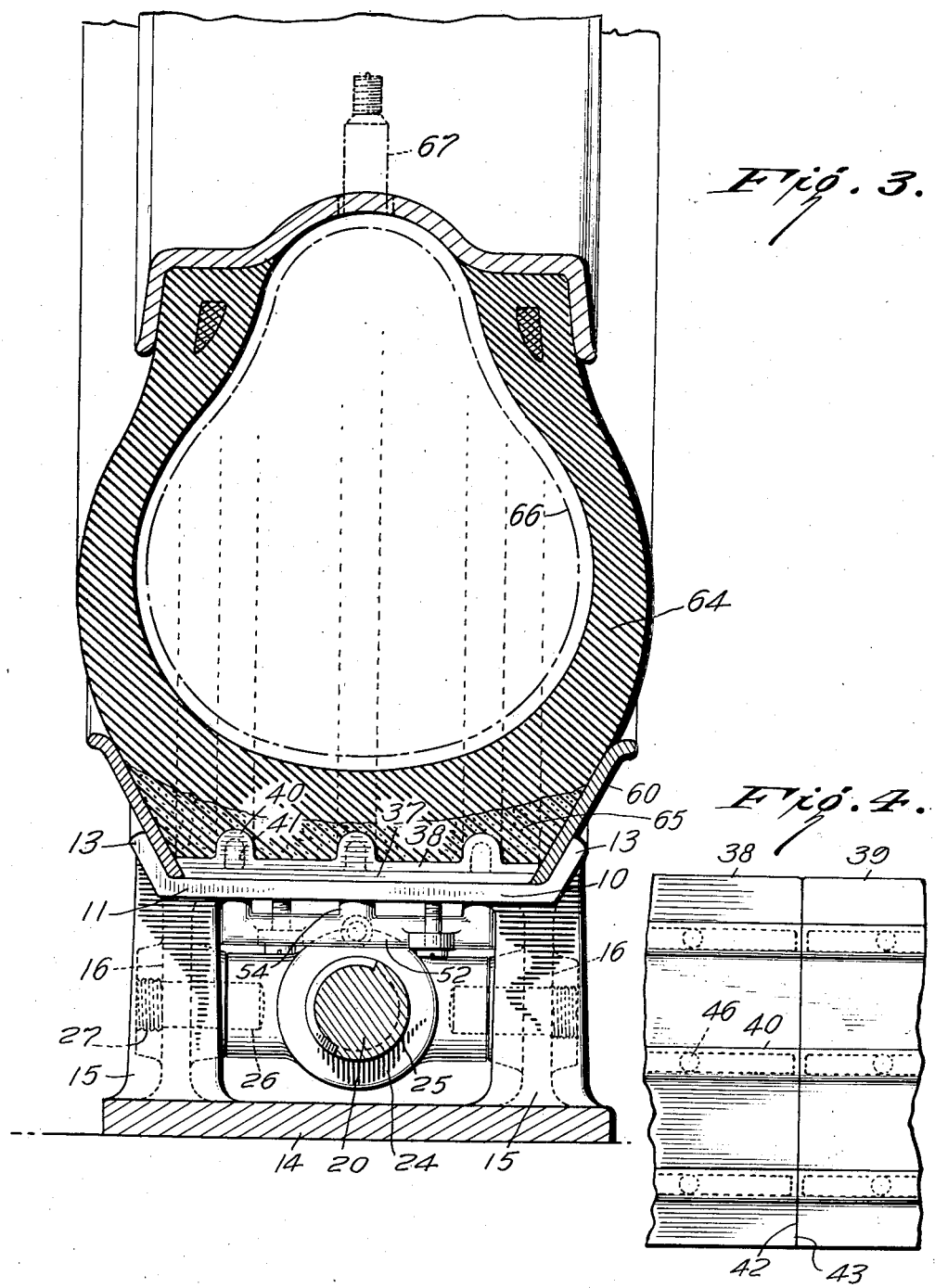
Fig. 3 is a broken vertical section taken on line 3—3 of Fig. 1.
Fig. 4 is a broken plan view of the meeting terminals of the heating chamber.

The tire retreading apparatus in its presently preferred form comprises a split annular tire encircling member or channel 10 having terminal portions 11 and 12 which are in meeting engagement when the device is in operative position. This tire encircling member or band is provided with inwardly turned flanges 13 on each side thereof, the flanges being disposed at an obtuse angle to the flat body portion of the tire encircling member. The end portion 11 of the annular member is rigidly mounted on a base 14 in spaced relation thereto by means of a pair of spaced supporting elements 15 having integrally formed, rearwardly extending vertical spaced supporting walls 16. The supporting elements 15 and 16 are desirably secured to the terminal portion 11 of the annular member by means of welding or otherwise.

The opposite terminal 12 of the ring is provided with a pair of spaced, downwardly extending supporting elements 19 which likewise are welded to the outer surface of the ring. The tire encircling ring is adapted to be maintained in its normally closed position by means of a jack screw 20 which is provided with right and left hand threads 21 and 22, respectively, in order to make the opening and closing more rapid. One end of the screw is operatively attached to the terminal 11 of the annular ring by means of a block 24 having a longitudinal, threaded aperture 25 through which the screw passes. The block is pivotally mounted between the supporting walls 16 by means of pins 26 having threaded heads 27 provided with transverse slots 28. Likewise, the opposite end of the screw is connected with the terminal 12 by means of a block 31 having a longitudinal threaded aperture through which the threaded portion 22 passes. This block is pivotally mounted between the supporting elements 19 by means of headed pins 32 similar to the pins 26. The screw is adapted to be revolved by means of a handle 33, the outer end of the screw being journalled in a vertical supporting member 34.

The heating element consists of two concentrically arranged circular bands 37 and 38, the marginal edges 39 of which are suitably joined together by means of welding or otherwise. The outer band 37 is of the same diameter as the inner diameter of the tire encircling ring 10 when the latter is in a closed position and the inner band 38 is formed with suitable outwardly protruding longitudinal ribs 40 which form steam chambers 41. Thus the exposed surface of the inner band 38 forms the tread engaging portion of the heating element and the precise configuration of this surface may be altered to suit the particular design of the retreaded tire.

The terminals 42 and 43 of the heating element are aligned with the terminals 11 and 12 of the outer tire encircling ring and the heating element desirably possesses substantially the same degree of flexibility as the outer ring in order that when the tire is to be removed, the heating element springs open, as does the outer ring when the supporting means are released, as shown in Fig. 5. The circular heating element is not bolted or otherwise secured to the outer ring 10, but is merely positioned within the ring and is left to float therein in order to accommodate any changes of length due to variations in temperature. The areas of the meeting portions of the concentric bands between the outwardly protruding longitudinal ribs 40 may be spot welded if desired. Steam is introduced into the heating chamber by means of a transverse steam header 44 having a plurality of outlets 45, each of which passes into an aperture 46 having flanges 47 in the band 37 communicating with each chamber 41. The steam header is further provided with a nipple 48 which is connected with the source of supply of the steam and the header is secured to the band 37 by means of screws 49. The opposite terminal of the heating element is provided with a steam outlet which includes a header 52 similar to the header 44 provided with a nipple 53 and outlets 54, the header also being secured to the band 37 by means of screws 55. The terminals 11 and 12 are suitably provided with openings 57 to accommodate the headers.

The flanges 13 which are integrally formed with the tire encircling ring 10 may be of the approximate dimensions illustrated in the drawings or they may, if desired, extend outwardly a greater distance in order to engage the full shoulder portion of the tire which is being retreaded. It is preferred, however, to provide supplemental flanges 60 on either side of the tire encircling ring, said flanges being complete rings and having an outer diameter substantially the same as the inner diameter of the tire encircling ring when the latter is in closed position.

The operation of the device is substantially as follows. The tread portion of the tire 64 to be retreaded is first wrapped with the retreading material 65 which material is usually known in the trade as "camel-back". A suitable adhesive substance between the tread portion and the retreading material is employed and the tire placed within the tire encircling member having the removable flange member, and the jack screw 20 tightened. In order to afford adequate inner support for the tire an inner tube 66 having a valve 67 is placed within the casing and suitably inflated.

Steam is now introduced into the heating element for approximately one hour, after which the retreaded tire is removed. In the event that the outer tire encircling member is constructed of rather heavy gauge metal, the inwardly turned flanges may make the proper opening of the device somewhat difficult. In this instance, it is desirable to provide a plurality of spaced saw cuts in the flanges, which makes for a more uniform expansion of the ring. Whereas a jack screw has been illustrated for closing the rings any hydraulic or fluid pressure means may be employed. Also a heat insulating ring may be employed between the outer ring and the heating element in order to conserve the heat.

What I claim is:

1. In a tire retreading device, the combination of a substantially flat annular heating element adapted to encircle a tire and a ring positioned externally of and enclosing said heating element, means associated with the external ring for engaging a portion of the side walls of the tire, the heating element being made from a plurality of concentric bands, the inner band having an inwardly bent, annularly disposed rib which forms a chamber between the two bands for the reception of a heating fluid said inner band constituting the mold ring and being adapted to engage the surface of the tire, the bands being joined together adjacent to their marginal edges to confine the heating fluid within the chamber.

2. In a tire retreading device, the combination of a substantially flat annular heating element adapted to encircle a tire and a ring positioned externally of and enclosing said heating element, the external ring being provided with a flange for engaging the side walls of the tire and retain same in position within the heating element, the heating element being made from a plurality of concentric bands joined together along their marginal edges, the inner band having a plurality of inwardly bent, annularly disposed ribs which form chambers between the two bands for the reception of a fluid heating element, a portion of such chambers lying below the tread surface of the tire.

3. In a tire retreading device, the combination of a substantially flat annular heating element adapted to encircle a tire, and a substantially flat ring positioned externally of and enclosing said heating element, the external ring being provided with means for engaging a portion of the side walls of the tire and retain same in position within the heating element, the heating element being made from a plurality of concentric bands joined together adjacent to their marginal edges, the inner band having a plurality of inwardly bent, annular ribs which form chambers between the two bands for the reception of a heating fluid, the heating element and the flat ring being transversely split to permit expansion while the tire is being inserted therein, and means for maintaining the terminals of the heating element and the ring in meeting engagement after the tire is positioned therein.

4. In a tire retreading device, the combination of an annular heating element adapted to encircle the tire, the heating element being constructed from a pair of substantially flat concentric bands joined together along their marginal edges, the inner band having a plurality of spaced, inwardly bent, annularly disposed ribs which engage the tire, which ribs form chambers between the bands adapted to receive a heating fluid, a portion of said chambers being positioned below the tread surface of the tire, and a substantially flat annular ring positioned externally of and enclosing said heating element, the ring having inwardly turned annular flanges on each side thereof adapted to engage the shoulders of the tire.

5. In a tire retreading device, the combination of an annular heating element adapted to encircle the tire, the heating element being constructed from a pair of substantially flat concentric bands being joined together adjacent to their marginal edges, the inner band having a plurality of spaced, inwardly bent annular ribs which form chambers between the bands, said chambers being adapted to receive a heating fluid, a portion of said chambers being positioned below the tread surface of the tire, and a substantially flat annular ring positioned externally of and enclosing said heating element, the ring having inwardly turned annular flanges on each side thereof adapted to engage the shoulders of the tire, the ring and the heating element being transversely split to permit expansion thereof while the tire is being inserted therein and fluid inlet and outlet means, respectively, being positioned adjacent to the terminals of the heating element.

6. In a tire retreading device, the combination of a substantially flat annular heating device adapted to encircle a tire and a ring positioned externally of and enclosing said heating device, the external ring being provided with means for engaging the side walls of the tire and retain same in position within the heating element, the heating device being made from a plurality of concentric bands joined together along their marginal edges, the inner band having an inwardly bent annular rib which forms an elongated chamber between the two bands for the reception of heating means, a portion of such chamber lying below the tread surface of the tire.

ANTHONY RICCIO.